United States Patent [19]

Hiramatsu et al.

[11] Patent Number: 5,136,614
[45] Date of Patent: Aug. 4, 1992

[54] SPREAD SPECTRUM COMMUNICATION SYSTEM

[75] Inventors: Tatsuo Hiramatsu, Higashiosaka; Hideki Kasamatsu, Neyagawa, both of Japan

[73] Assignee: Sanyo Electric Co., Ltd., Osaka, Japan

[21] Appl. No.: 737,583

[22] Filed: Jul. 25, 1991

Related U.S. Application Data

[63] Continuation of Ser. No. 519,182, May 4, 1990, abandoned.

[30] Foreign Application Priority Data

May 8, 1989 [JP] Japan .................... 1-114836
Feb. 20, 1990 [JP] Japan .................... 2-38684

[51] Int. Cl.⁵ .......................................... H04L 27/30
[52] U.S. Cl. .................................... 375/1; 380/34; 375/115; 375/119; 375/120
[58] Field of Search ............... 375/1, 115, 119, 120; 380/34, 48

[56] References Cited

U.S. PATENT DOCUMENTS

3,878,527  4/1975  Rensin et al. .............. 375/1 X

Primary Examiner—Bernarr E. Gregory
Attorney, Agent, or Firm—Armstrong, Nikaido, Marmelstein, Kubovcik & Murray

[57] ABSTRACT

A spread spectrum communiction system includes a transmitter and a receiver, and an on-off keying signal is inputted to the transmitter. A carrier signal is modulated by the on-off keying signal, and a spread spectrum signal is produced by multiplying a modulated signal by a first PN code which is repetition of 3-bit data. The spread spectrum signal is transmitted through a transmission antenna. In the receiver, a second PN code which is repetition of 4-bit data larger than the first PN code by 1 bit is generated. Therefore, a phase of the second PN code becomes coincident with a phase of the first PN code every 12 bits. Then, a spread spectrum demodulation is performed by multiplying a received spread spectrum signal by the second PN code to reproduce the carrier signal being modulated by the on-off keying signal. The on-off keying signal is restored by envelope-detecting a reproduced carrier signal.

17 Claims, 7 Drawing Sheets

F I G. 1

PRIOR ART

F I G. 2

PRIOR ART

FIG. 8
(A) BINARY DATA

FIG. 8
(B) OUTPUT OF 13

FIG. 8
(C) PN CODE FROM 16

FIG. 8
(D) PN CODE FROM 23

FIG. 8
(E) OUTPUT OF 24

FIG. 8
(F) OUTPUT OF 26

FIG. 6

(A) OUTPUT OF 162

FIG. 6

(B) OUTPUT OF 161 (PN CODE)

FIG. 7

(A) OUTPUT OF 232

FIG. 7

(B) OUTPUT OF 234

FIG. 7

(C) OUTPUT OF 233

FIG. 7

(D) OUTPUT OF 231 (PN CODE)

FIG. 11
(A) OUTPUT OF 31

FIG. 11
(B) OUTPUT OF 32

FIG. 11
(C) OUTPUT OF 162

FIG. 11
(D) OUTPUT OF 164

FIG. 11
(E) PN CODE FROM 161

FIG. 11
(F) OUTPUT OF 17

SPREAD SPECTRUM COMMUNICATION SYSTEM

This application is a continuation of application Ser. No. 519,182 filed May 4, 1990, now abandoned.

BACKGROUND OF THE INVENTION

1. Field of the Invention

The present invention relates to a spread spectrum communication system. More specifically, the present invention relates a spread spectrum communication system in which an information signal is communicated in a remote control or remote sensing.

2. Description of the Prior Art

Conventionally, a spread spectrum communication system is known, wherein a carrier signal a spectrum of which is spread by a binary pseudo noise code (hereinafter, simply called as "PN code") having a spectrum width sufficiently broader than an information signal is transmitted, and at a receiving side, an original information signal is restored by multiplying a received signal by a PN code which is the same as that being used at a transmitting side.

In such a spread spectrum communication system, since the spectrum of the information signal is spread by a PN code having a broader spectrum width, in order to correctly restore the information signal, it is necessary to synchronize the PN code which is generated at the receiving side with the PN code at the transmitting side.

Figure 1:
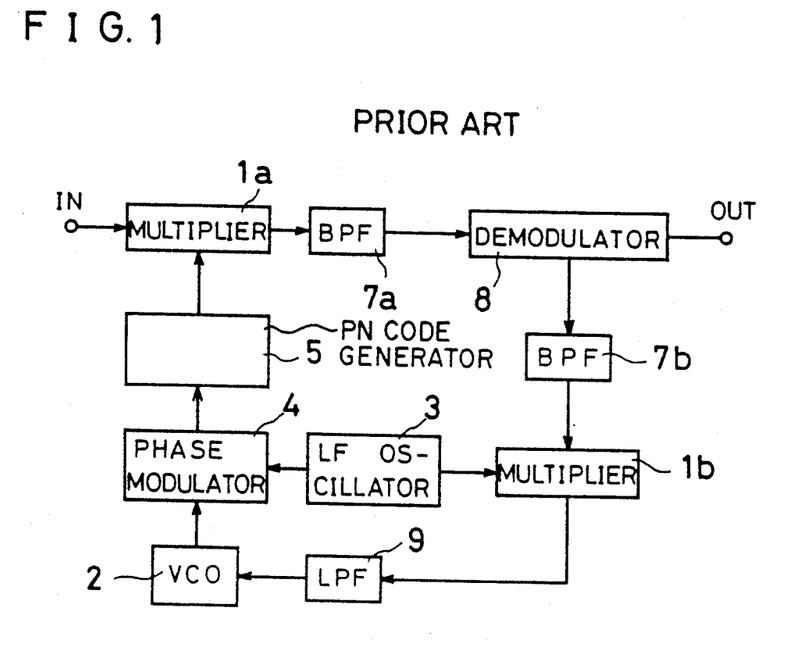
FIG. 1 is a block diagram showing a conventional tau-dither method.

As a method for synchronizing both the PN codes, a tau-dither method as shown in FIG. 1 is well known. In FIG. 1, a received spread spectrum signal is inputted to a first multiplier 1a through an input terminal IN. In addition, an output of a VCO (voltage-controlled oscillator) 2 is phase-modulated by an output signal from a low-frequency oscillator 3 such as a multivibrator in a phase demodulator 4. An output from the phase demodulator 4 is given to a PN code generator 5 and used as a clock signal therein. A PN code from the PN code generator 5 is multiplied by the received spread spectrum signal in the first multiplier 1a. An output from the first multiplier 1a is given to a demodulator 8 through a bandpass filter 7a. An output of the bandpass filter 7a is envelope-detected in the demodulator 8 to be outputted to an output terminal OUT. An output of the demodulator 8 is further given to a second multiplier 1b through a bandpass filter 7b. Then, in the second multiplier 1b, the output signal from the low-frequency oscillator 3 is multiplied by an output signal from the bandpass filter 7b. An output signal of the second multiplier 1b is given to the VCO 2 through a low-pass filter 9 as a control signal.

Figure 2:
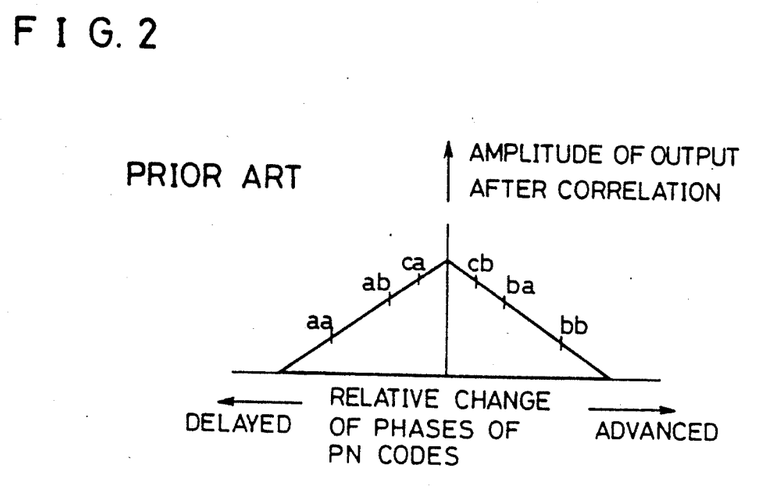
FIG. 2 is a graph showing a change of an output signal amplitude with respect to a relative change of phases of PN codes in a spread spectrum communication system.

In the spread spectrum communication system, it is known that a level of the output signal from the first multiplier 1a is changed as shown in FIG. 2 in accordance with a relative change of phases of the PN code included an inputted spread spectrum signal and the PN code from the PN code generator 5.

Now, assuming that an initial phase of the PN code from the PN code generator 5 exists a position of a point aa of FIG. 2 and the phase is advanced and shifted to a point ab, a relative phase of both the PN codes plys between both the points aa and ab in accordance with a rectangular signal from the low-frequency oscillator 3, and in response thereto, the output signal of the first multiplier 1a is subjected to an amplitude modulation at the same frequency as that of the rectangular signal. This amplitude-modulated components are derived by the bandpass filter 7b and thereafter multiplied by the rectangular signal in the second multiplier 1b so that a direct current signal having a correct polarity and a correct level is obtainable to be given to the VCO 2 as a control signal. A frequency of the VCO 2 is changed by the control signal, thereby to change the phase of the PN code from PN code generator 5.

In addition, in a case where the relative phase of the both PN codes plys between points ba and bb, a polarity of the output of the first multiplier 1a is reversed and a phase change of the PN code from the PN code generator 5 is also reversed.

Furthermore, in a case where the relative phase of the both the PN codes plys between points ca and cb sandwiching a peak of a correlation output as shown in FIG. 2, no change occurs in an amplitude of the output signal from the first multiplier 1a. Therefore, no amplitude-modulated components to be supplied to the second multiplier 1b exist, and thus, an oscillation frequency of the VCO 2, that is, the phase of the PN code from the PN code generator 5 is not changed.

In such a tau-dither method, in order to synchronize the phase of the PN code at the receiving side with that of the PN code at the transmitting side, it is necessary to use the phase modulator 3 as shown in FIG. 1. Therefore, a circuit configuration thereof was complex.

SUMMARY OF THE INVENTION

Therefore, a principal object of the present invention is to provide a novel spread spectrum communication system.

Another object of the present invention is to provide a spread spectrum communication system in which a circuit configuration at a receiving side can be simple.

Another object of the present invention is to provide a spread spectrum communication system wherein it is not necessary to use specific circuit components for synchronizing a PN code at a transmitter with a PN code at a receiver.

A spread spectrum communication system in accordance with the present invention comprises: input means for inputting an on-off keying signal; first PN code generating means for generating a first PN code; spread spectrum modulating means for producing a spread spectrum signal by the on-off keying signal, a carrier signal and the first PN code; means for transmitting the spread spectrum signal; receiving means for receiving the spread spectrum signal transmitted from the transmitting means; second PN code generating means for generating a second PN code having a phase difference which is gradually changed with respect to the first PN code; spread spectrum demodulating means for reproducing a carrier signal being modulated by the on-off keying signal by a spread spectrum demodulating a received spread spectrum signal by the second PN code from the second PN code generating means; and means for outputting the on-off keying signal by detecting a reproduced carrier signal.

A phase of the second PN code is gradually changed with respect to a phase of the first PN code. Therefore, a phase correlation can be cyclically established between the first PN code and the second PN code. In a state where such a phase correlation is established, an output is obtained in a receiver and, by detecting the output, an original on-off keying signal can be restored. In accordance with present invention, a relative phase of the first and second PN codes is cyclically changed, and therefore, it is possible to synchronize both the PN codes with each other without any specific additional means such as a phase modulator. Therefore, in comparison with a receiver in accordance with conventional tau-dither method as shown in FIG. 1, a circuit configuration of the receiver becomes simple.

The spread spectrum communication system in accordance with present invention suits to communicate an information signal, that is, an on-off keying signal such as a control signal, sensing signal or the like in a remote control system, remote sensing system or the like.

The objects and other objects, features, aspects and advantages of the present invention will become more apparent from the following detailed description of the embodiments of the present invention when taken in conjunction with accompanying drawings.

BRIEF DESCRIPTION OF THE DRAWINGS

FIG. 3A and 3B are block diagrams showing one embodiment in accordance with the present invention, wherein FIG. 3A shows a transmitter and FIG. 3B shows a receiver.

FIG. 10A and FIG. 10B are block diagrams showing another embodiment in accordance with present invention, wherein FIG. 10A shows a transmitter and FIG. 10B shows a receiver.

DETAIL DESCRIPTION OF THE PREFERRED EMBODIMENTS

Figure 3A:
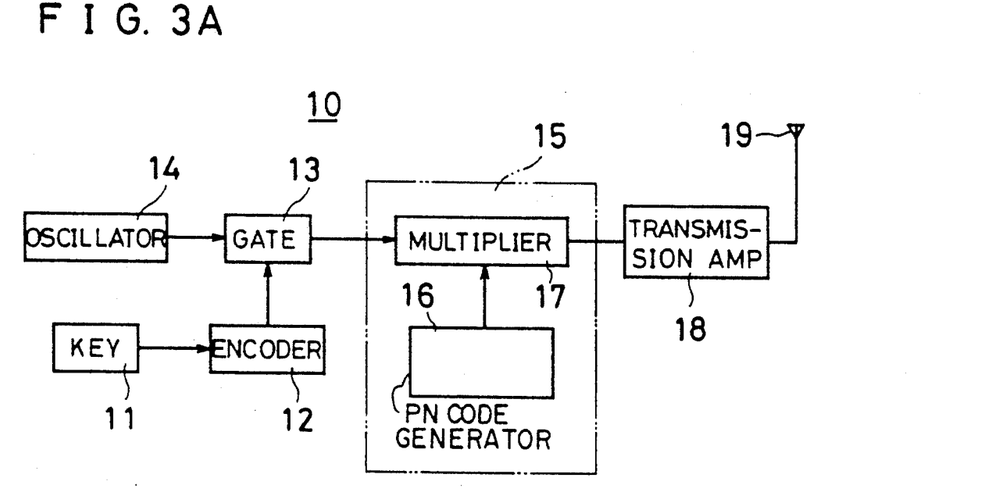
Figure 3B:
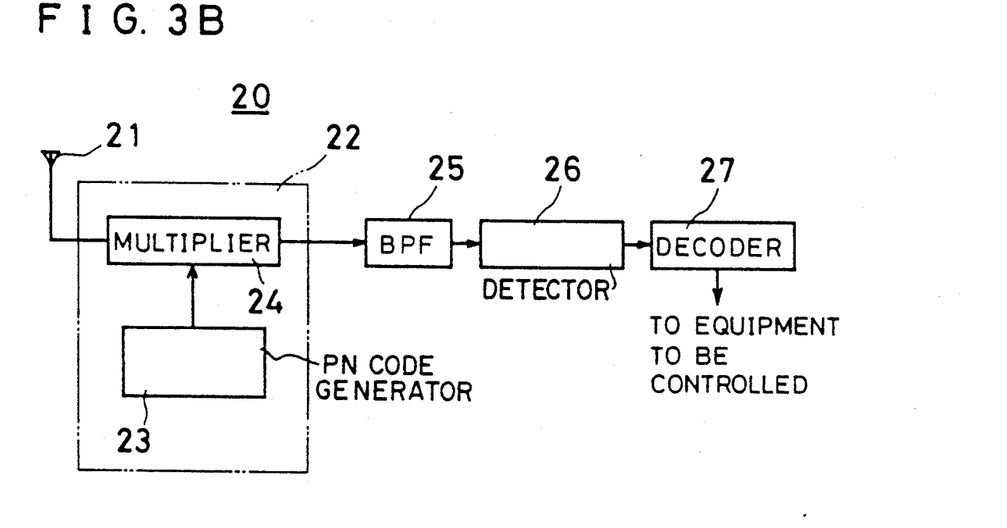

With reference to FIG. 3A and FIG. 3B, a spread spectrum communication system of this embodiment shown includes a transmitter 10 and a receiver 20.

The transmitter 10 includes a ten-key 11, for example, and a key signal from the ten-key 11 is converted into an on-off keying signal of 1 kbps, for example, by an encoder 12. The on-off keying signal is given to a gate circuit 13 which receives a carrier signal of 300 MHz, for example, from an oscillator 14. The gate circuit 13 gives the carrier signal from the oscillator 14 to a spread spectrum modulating portion 15 within an on-period of the on-off keying signal. The spread spectrum modulating portion 15 includes a PN code generator 16 and a multiplier 17 which multiplies an output signal from the gate circuit 13 by a first PN code from the PN code generator 16. An output of the multiplier 17 is transmitted from a transmission antenna 19 through a transmission amplifier 18.

The receiver 20 includes a reception antenna 21 which receives a spread spectrum signal being transmitted from the transmission antenna 19, and the spread spectrum signal received by the reception antenna 21 is given to a spread spectrum demodulating portion 22. The spread spectrum demodulating portion 22 includes a PN code generator 23 and a multiplier 24 which multiplies a received spread spectrum signal by a second PN code from PN code generator 23. An output of the multiplier 24 is given to a detector 26 through a bandpass filter 25. The detector 26 envelope-detects an output of the bandpass filter 25 and an output thereof is given to a decoder 27.

Figure 4:
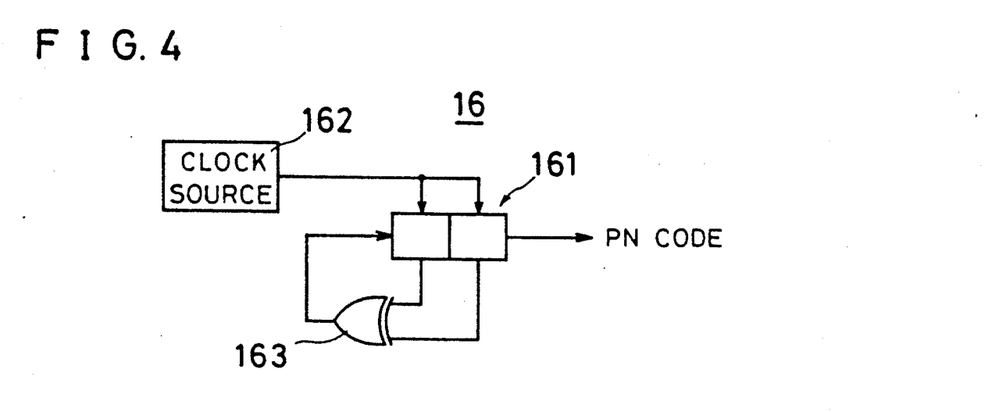
FIG. 4 is a block diagram showing a PN code generator shown in FIG. 3A.

Now, with reference FIG. 4, a description will be made on the PN code generator 16 included in the spread spectrum modulating portion 15 of the transmitter 10. The PN code generator 16 includes a 2-bit shift register 161 and a clock from a clock source 162 is applied to the shift register 161 as a shift clock thereof. Outputs of respective bits of the shift register 161 are given to an exclusive OR gate 163 and an output of the exclusive OR gate 163 is inputted to the most significant bit of the shift register 161. Then, a first PN code is outputted from the least significant bit of the shift register 161.

Figure 6:
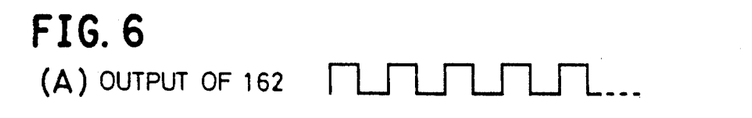
FIGS. 6A-6B are an illustrative view showing a PN code generated by a PN code generator of FIG. 4.

If the contents of the shift register 161 are initially "11", the output of the exclusive OR gate 163 becomes "0", and therefore, the contents of the shift register 161 becomes "01" in response to a next clock from the clock source 162. At this time, the exclusive OR gate 163 receives "0" and "1" and thus outputs "1". Therefore, when a next shift clock is given thereto, the contents of the shift register 161 becomes "10". Therefore, the output of the exclusive OR gate 163 becomes "1" again and, when a next shift clock is given thereto, the contents of the shift register 161 becomes "11". Thus, as shown in FIG. 6, in response to each of the shift clocks from the clock source 162, a first PN code x, y and z such as "1", "1" and "0" are cyclically outputted. Therefore, the first PN code is formed by repetition of the data of 3 bits, for example.

Figure 5:
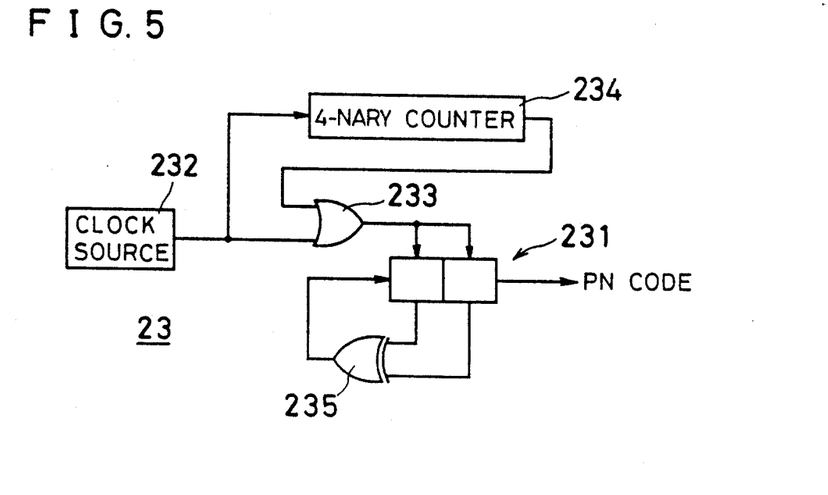
FIG. 5 is a block diagram showing a PN code generator shown in FIG. 3B.

With reference to FIG. 5, as similar to the PN code generator 16, the PN code generator 23 of the receiver 20 includes a 2-bit shift register 231. A clock from a clock source 232 is given to the shift register 231 as a shift clock thereof through one input of an OR gate 233. To the other input of the OR gate 233, an output of 4-nary counter 234 is given, which receives a clock from the clock source 232 as a count input thereof. Then, outputs of respective bits of the shift register 231 are applied to respective inputs of an exclusive OR gate 235 an output of which is given to the most significant bit of the shift register 231. Then, a second PN code is outputted from the least significant bit of the shift register 231.

Figure 7:
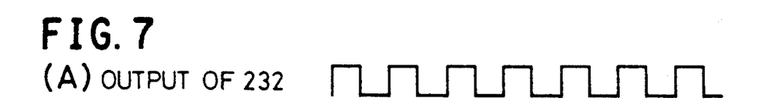
FIGS. 7A-7D are an illustrative view showing a PN code generated by a PN code generator of FIG. 5.

A clock as shown in FIG. 7(A) is outputted from the clock source 232 and the clock is counted by the 4-nary counter 234. Therefore, an output which becomes the high level at every 4 clocks is outputted from the 4-nary counter 234, as shown in FIG. 7(B). Since the output of the 4-nary counter 234 and the clock from the clock source 232 are applied to the OR gate 233, an output of the OR gate 233 becomes as shown in FIG. 7(C).

If the contents of the shift register 231 is initially "11", the output of the exclusive OR gate 253 becomes "0", and the output thereof is given to the most significant bit of the shift register 231. Therefore, when a next shift clock is applied thereto through the OR gate 233, the contents of the shift register 231 becomes "01". At a timing of a next shift clock, the contents of the shift register 231 becomes "10". Therefore, as similar to the PN code generator 16 as shown in FIG. 4, a second PN code x, y and z such as "1", "1" and "0" are outputted from the shift register 231. However, as seen from FIG. 7(C) and FIG. 7(D), a width of the PN code x is expanded to double each of the other PN codes y and z due to the output of the 4-nary counter 234. Therefore, a front half of the PN code x becomes a blank or indefinite bit "*" (a dummy bit). Therefore, as shown FIG. 7(D), *, x, y and z are cyclically outputted from the PN code generator 23 shown in FIG. 5. Therefore, the second PN code is formed by repetition of the data of 4 bits. Thus, by making the number of bits of the first PN code different from the number of bits of the second PN code, a phase of the second PN code can be gradually changed with respect to a phase of the first PN code.

Figure 8:
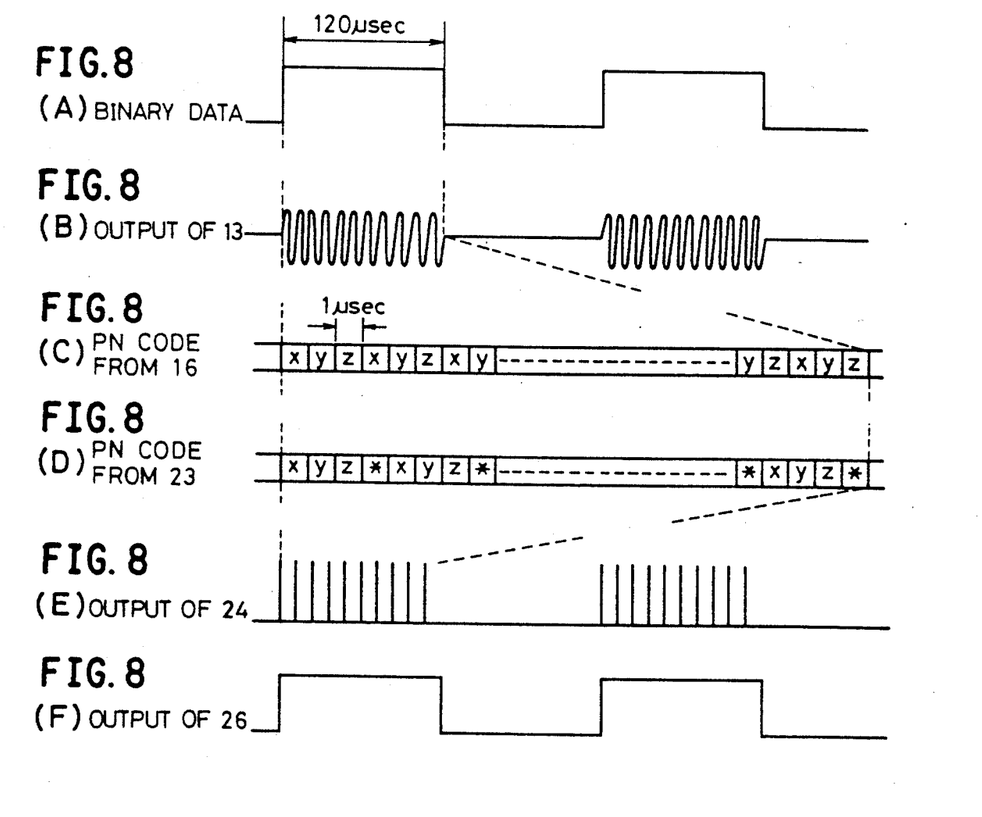
FIGS. 8A-8F are a waveform chart showing an operation of the embodiment shown in FIG. 3A and FIG. 3B.

With reference to FIG. 8, if the ten-key 11 of the transmitter 10 is operated, in response to an operation thereof, an on-off keying signal as shown in FIG. 8(A) is outputted from the encoder 12. Therefore, a carrier signal from the oscillator 14 is modulated by the on-off keying signal by the gate circuit 13, as shown in FIG. 8(B).

An output signal from the gate circuit 13 is supplied to the spread spectrum modulating portion 15 and multiplied by the first PN code from the PN code generator 16 in the multiplier 17. As described above, the first PN code is the repetition of x, y and z as shown FIG. 6(B), that is, FIG. 8(C). Then a signal which is spectrum-spread by the spread spectrum modulating portion 15 is amplified by the transmission amplifier 18 and thereafter transmitted from the transmission antenna 19.

A transmitted signal is received by the reception antenna 21 of the receiver 20, and therefore, a received spread spectrum signal is given to the spread spectrum demodulating portion 22. In the spread spectrum demodulating portion 22, a spread spectrum demodulation is performed by multiplying the spread spectrum signal by the second PN code from the PN code generator 23.

As described above, the second PN code from the PN code generator 23 is formed by repetition of the data of 4 bits which is x, y and z plus an indefinite bit, as shown in FIG. 7(D), that is, FIG. 8(D). In other words, since the second PN code from the PN code generator 23 is formed by the data of 3 bits of x, y and z plus 1 bit being indefinite, the same becomes equal to the first PN code x, y and z which is phase-shifted gradually one by one bit. Therefore, a correlation between the first PN code included in a received spread spectrum signal and the second PN code is established at every 12 bits. Therefore, the output of the multiplier 22 becomes as shown FIG. 8(E).

Assuming that a signal width of the on-off keying signal is 120 microseconds, for example, and a signal width (chip) of each of the first and second PN codes is 1 microsecond, a correlation between the first PN code in the spread spectrum modulating portion 15 and the second PN code n the spread spectrum demodulating portion 22 is established at every 12 microseconds, and therefore, in response to the on-off keying signal, ten (10) correlation signals are outputted as shown in FIG. 8(E).

Such correlation signals are given to the detector 26 through the bandpass filter 25 and envelope-detected therein. Therefore, the output of the detector 26 becomes the same as an originally inputted on-off keying signal as shown in FIG. 8(F). Then, a detected output is decoded by the decoder 27 and applied to an equipment (not shown) to be controlled as a control signal. Therefore, the equipment to be controlled is controlled to be brought in a state or mode designated by the on-off keying signal.

In addition, in the above described embodiment, one indefinite bit is inserted so that the phase of the second PN code of the receiver 20 can be gradually shifted to that of the first PN code of the transmitter 10.

Figure 9:
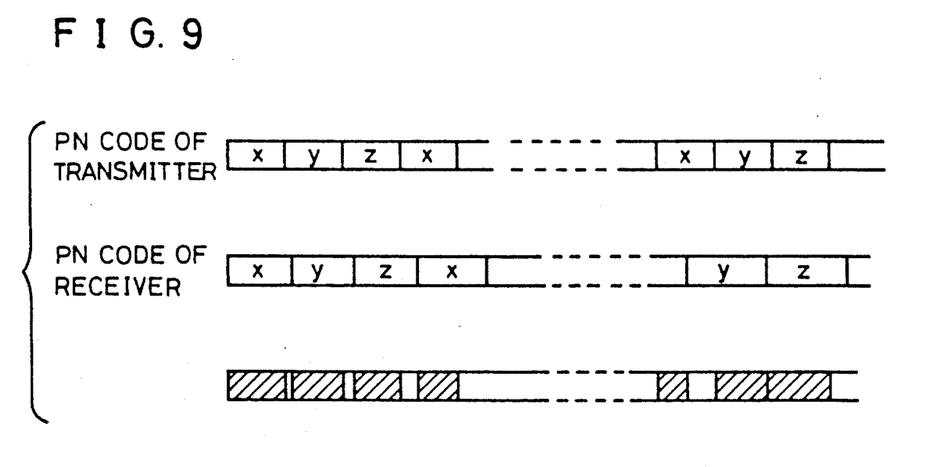
FIG. 9 is an illustrative view showing another example of a PN code.

However, frequencies of both the PN codes may be slightly and gradually deviated from each other as shown in FIG. 9. When the PN codes as shown in FIG. 9 are utilized, correlation signals are obtained from the spread spectrum demodulating portion 22 only at portions indicated by oblique lines in FIG. 9. Then, correlation signals are inputted to the detector 26 from the bandpass filter 25 and envelope-detected therein. Therefore, as similar to the above described embodiment, in such a case, it is possible to restore an original on-off keying signal. In addition, in order to deviate the frequencies of both the PN codes from each other, clock frequency of the clock source at the receiving side may be different from that of the clock source at the transmitting side, for example, the clock source 162.

As shown in FIG. 8(A), in an on-off keying signal from the ten-key 11 (FIG. 3A) or a various sensor (not shown), an off-state is longer than an on-state. If the PN code generator 16 is operated in the off-state and a power source thereof is a battery, such a battery is used wastefully. Therefore, in an embodiment shown in FIG. 10A and FIG. 10B, in the off-state of the on-off keying signal, the operations of the PN code generator 16' and 23' are stopped, thereby to save an energy.

Figure 10A:
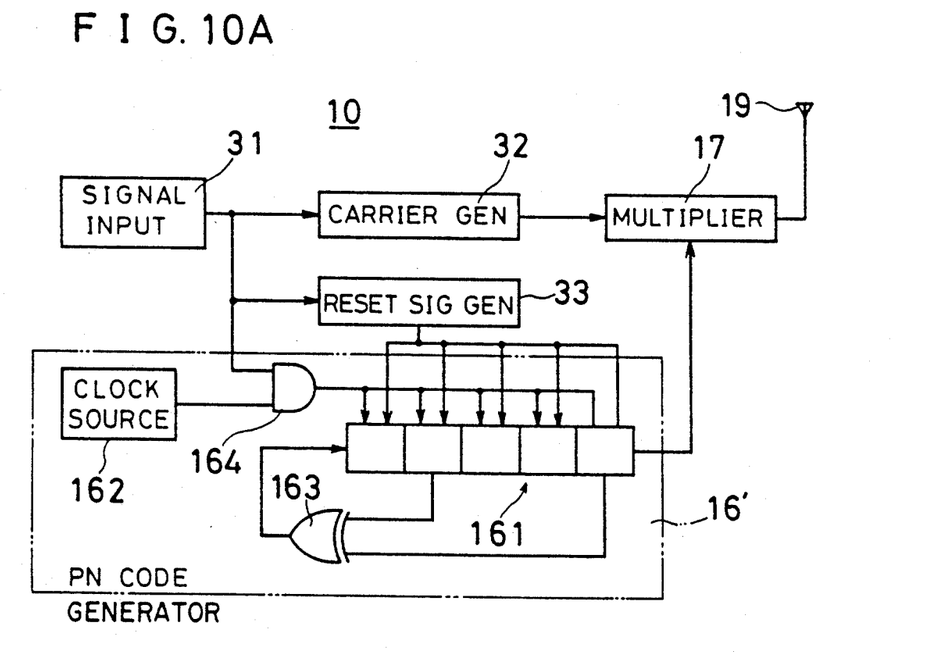

With reference to FIG. 10A, a transmitter 10 includes a signal input portion 31 which includes a combination of the ten-key 11 and the encoder 12 shown in FIG. 3A or a sensor (not shown) and inputs an on-off keying signal. The on-off keying signal from the signal input portion 31 is inputted to a carrier generator 32 which includes an oscillator similar to the oscillator 14 shown in FIG. 3A and further applied to a reset signal generator 33. The carrier generator 32 includes a gate circuit 13 as shown in FIG. 3A and modulates a carrier signal by the on-off keying signal. Therefore, an output of the carrier generator 32 becomes similar to a signal as shown in FIG. 8(B).

In this embodiment shown, a PN code generator 16' includes a 5-bit shift register 161' and a clock signal from the clock source 162 is applied to one input of an AND gate 164. The on-off keying signal from the signal input portion 31 is applied to the other input of the AND gate 164. An output of the AND gate 164 is applied to the shift register 161' as a shift clock thereof. A reset signal from the reset signal generator 33 is further applied to the shift register 161'. An upper second bit and the least significant bit of the shift register 161' are applied to respective inputs of the exclusive OR gate 163. Then, the output of the exclusive OR gate 163 is inputted to the most significant bit of the shift register 161'. Then, an output from the least significant bit of the shift register 161' is outputted as a first PN code.

Figure 11:
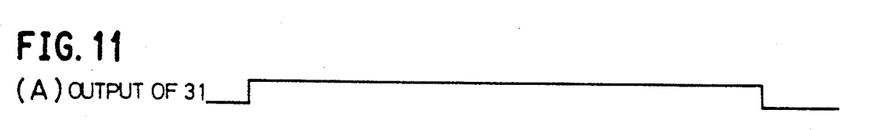
FIGS. 11A-11F are a waveform chart showing an operation of the embodiment shown in FIG. 10A.

In the PN code generator 16' shown in FIG. 10A, as shown in FIG. 11, the AND gate 161 is enabled only a time when an output of the signal input portion 31, that is, on-off keying signal is the on-state. Therefore, from the AND gate 164, as shown in FIG. 11(D), a clock signal (FIG. 11(C)) from the clock source 162 is given to the shift register 161' in only the on-state of the on-off keying signal. Therefore, only in the on-state of the on-off keying signal, the first PN code is outputted from the PN code generator 16', as shown in FIG. 11(E). Then, an output of the carrier generator 32 as shown in FIG. 11(B) is multiplied by the first PN code in the multiplier 17, and therefore, a spread spectrum signal as shown in FIG. 11(F) is outputted from the multiplier 17 and the same is transmitted from the transmission antenna 19. Thus, in this embodiment shown, an operation of the PN code generator 16' in the off-state of the on-off keying signal is stopped.

In addition, the reset signal generator 33 detects a falling edge of the on-off keying signal and outputs a reset signal in response thereto. The reset signal is applied to reset inputs of flip-flops (not shown) constituting the shift register 161', and therefore, the shift register 161' is reset at the falling edge of the on-off keying signal to be returned to an initial state thereof. Therefore, the shift register 161' starts to operate from the initial state thereof whenever the on-off keying signal becomes the on-state Thus, the first PN code from the PN code generator 16' is prevented from being disturbed.

As described above, in the off-state of the on-off keying signal, no spread spectrum signal is transmitted from the transmitter 10, and therefore, in the receiver 20, it is necessary to surely receive and demodulate a spread spectrum signal when the same is transmitted from the transmitter 10. Therefore, an embodiment shown in FIG. 10B, the receiver 20 is provided with a reception detector 34. The reception detector 34 detects a signal inputted from the reception antenna 21 and applies an enable signal to the PN code generator 23'. Therefore, the PN code generator 23' performs an operation similar to that described above when a spread spectrum signal is received so as to generate the second PN code.

Figure 10B:
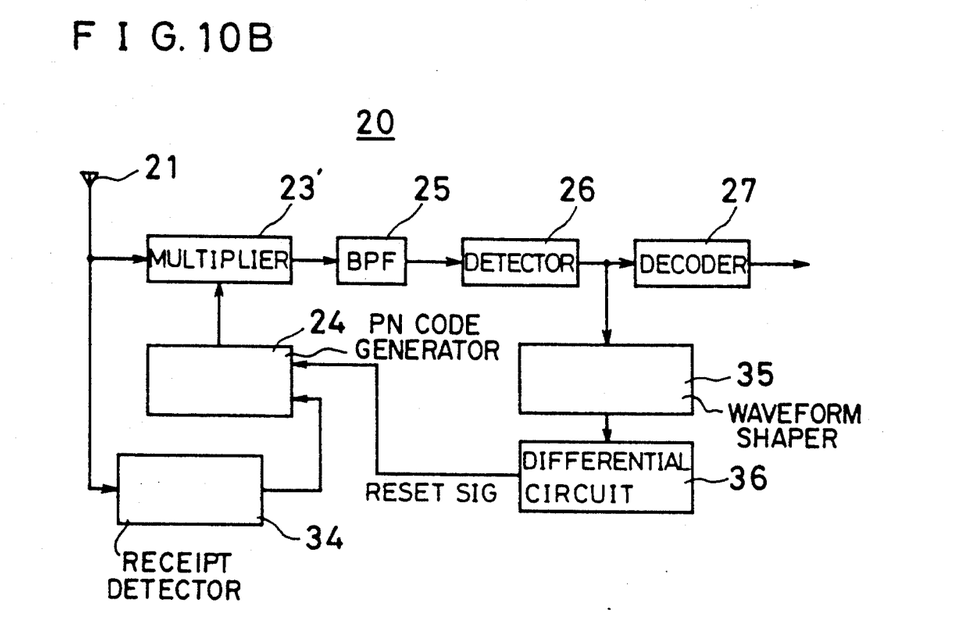

In addition, in this embodiment shown in FIG. 10A and FIG. 10B, the second PN code is generated so that a phase of the second PN code in the receiver 20 is gradually shifted from a phase of the first PN code in the transmitter 10 at every repetition interval, whereby, as similar to the embodiment shown in FIG. 3A and FIG. 3B, it is possible to omit a phase modulator which was used in the conventional tau-dither method from the receiver 20.

Furthermore, in the embodiment shown in FIG. 10B, an output of the detector 26 is applied to the decoder 27 and a waveform shaping circuit 35. The waveform shaping circuit 35 shapes a signal as envelope-detected into a pulse and applies the same to a differential circuit 36. The differential circuit 36 detects a falling edge of a signal from the waveform shaping circuit 35 and, in response to a detection, applies a reset signal to the PN code generator 23'. The reset signal resets a shift register 231 (FIG. 5) constituting the PN code generator 23', as similar to the reset signal from the reset signal generator 33 of FIG. 10A. Therefore, as similar to the PN code generator 16', the PN code generator 23' starts to operate from an initial state thereof whenever a spread spectrum signal is received, whereby the second PN code is prevented from being disturbed.

Figure 12:
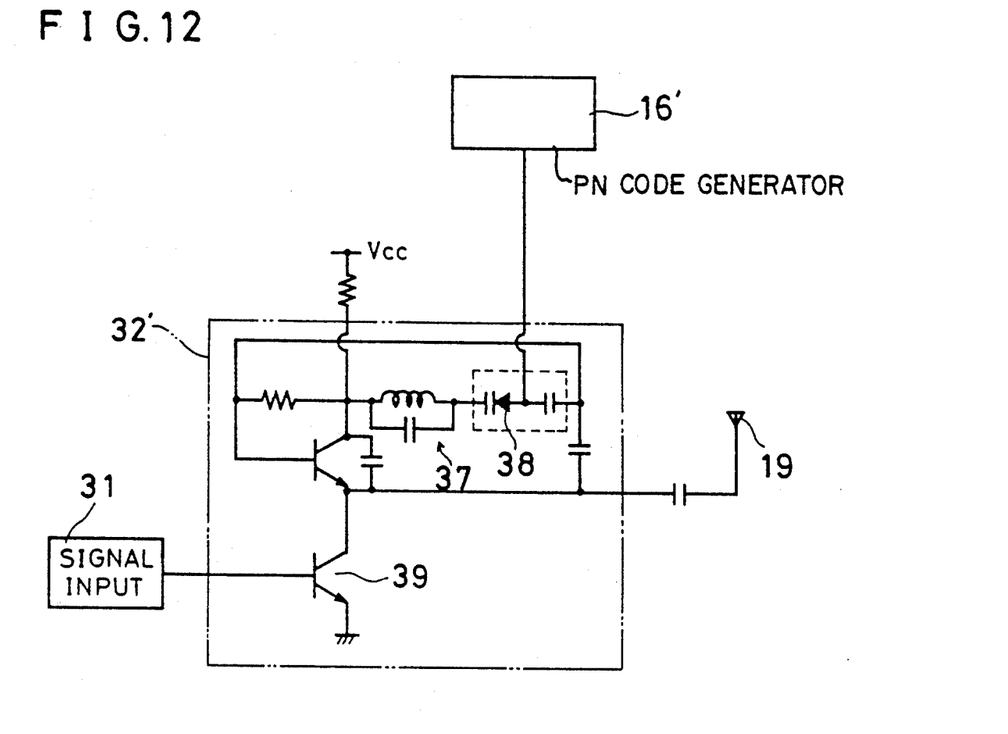
FIG. 12 is a circuit diagram showing a modified example of the embodiment as shown in FIG. 10A.

In addition, in the embodiment shown in FIG. 3A or FIG. 10A, a spread spectrum signal is obtained through a multiplication of a carrier signal modulated by the on-off keying signal and the PN code; however, a generation of the carrier signal and spread spectrum modulation may be simultaneously performed as shown in FIG. 12.

More specifically, in FIG. 12 embodiment, a carrier generator 32' is provided with an oscillator 37 having a variable capacitance diode 38, and the first PN code from the PN code generator 16' (or 16) is applied to an anode of the variable capacitance diode 38. Then, when the on-off keying signal becomes the on-state, a transistor 39 is turned-on and thus the carrier oscillator 37 constituted by the variable capacitance diode 38 is operated. When the carrier oscillator 37 is in an oscillation state, an anode voltage of the variable capacitance diode 38 is changed by a voltage of the first PN code. Therefore, a capacitance value of the variable capacitance diode 38 is changed in accordance with the first PN code, and therefore, as similar to the previous embodiments, a signal being spectrum-spread by the first PN code is resultingly transmitted from the transmission antenna 19.

Figure 13:
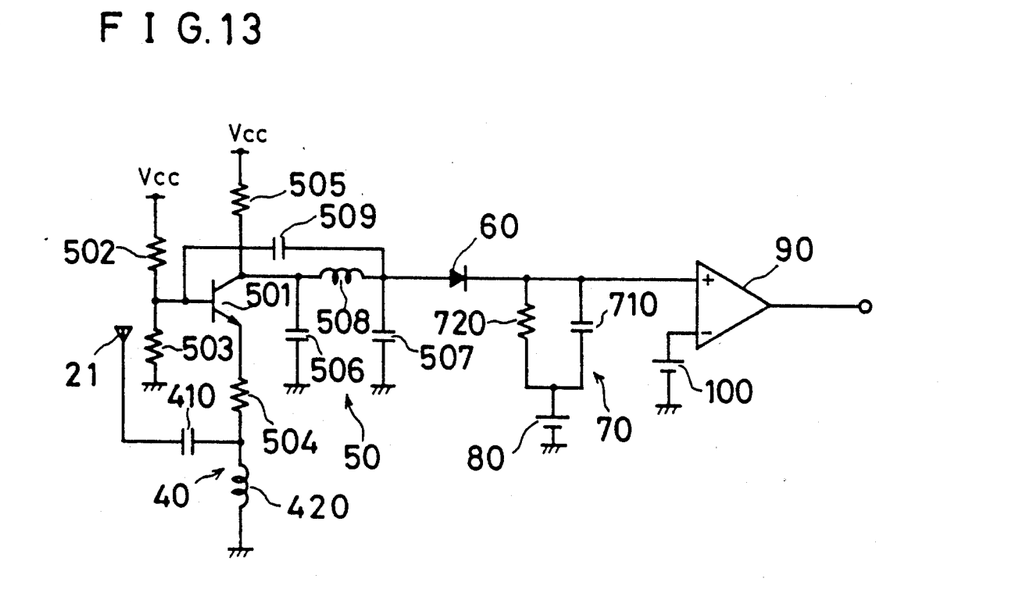
FIG. 13 is a circuit diagram showing a receiver for receiving a spread spectrum signal from a transmitter as shown in FIG. 12.

When FIG. 12 embodiment is used, a receiver may be changed as shown in FIG. 13.

In FIG. 13, a reception tuning circuit 40 connected to the reception antenna 21 includes a capacitor 410 and a coil 420, and the reception tuning circuit 40 having a reception band width of 400 kHz is tuned at 300 MHz, for example. An oscillator 50 generates a carrier signal in response to the presence of a received signal, and the oscillator 50 includes a transistor 501, resistors 502, 503 and 504 for setting a collector current of the direct current of the transistor 501, a collector resistor 505, and capacitors 506 and 507 and a coil 508 for determining an oscillation frequency thereof. An oscillation output from the oscillator 50 is detected by a diode 60 an output end of which is connected to a time constant circuit 70 which includes a capacitor 710 and a resistor 720. A first reference voltage source 80 outputs a first reference voltage having a voltage value equal to a collector bias voltage of the transistor 501, and a direct current voltage filtered by the time constant circuit 70 is compared with a second reference voltage from a second reference voltage source 100 by a comparing circuit 90.

Then, in FIG. 13 embodiment, when a signal existing in the reception band width of the reception tuning circuit 40 is received, the oscillator 50 becomes a state where a carrier signal is oscillated. On the other hand, a signal becomes absent in reception band width, the oscillator 50 becomes a stopped state. Therefore, an output of the oscillator 50 becomes a carrier signal modulated by the on-off keying signal resultingly. Then, a modulated carrier signal is detected by the diode 60 and filtered by the time constant circuit 70, and the output from the time constant circuit 70 is compared with the second reference voltage by the comparing circuit 90, whereby the modulated carrier signal is restored as the on-off keying signal.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A spread spectrum communication system, comprising:
   inputting means for inputting an on-off keying signal;
   first PN code generating means for generating a first PN code;
   spread spectrum modulating means, responsive to said on-off keying signal, for producing a spread spectrum signal in which a carrier signal is modulated by said on-off keying signal and said first PN code;
   means for transmitting said spread spectrum signal;
   receiving means for receiving said spread spectrum signal transmitted from said transmitting means;
   reproducing means for reproducing, based on said spread spectrum signal received by said receiving means, said carrier signal having been modulated by said spread spectrum modulating means, said reproducing means including second PN code generating means for generating a second PN code having a phase which is gradually changed with respect to a phase of said first PN code, and spread spectrum demodulating means for spread spectrum demodulating a received spread spectrum signal by said second PN code from said second PN code generating means; and
   means for detecting a reproduced carrier signal and for outputting said on-off keying signal.

2. A spread spectrum communication system in accordance with claim 1, wherein said second PN code generating means includes means for generating said second PN code with a repetition interval that is different from a repetition interval of said first PN code.

3. A spread spectrum communication system in accordance with claim 2, wherein said first PN code generating means includes means for generating said first PN code by repetition of data of a first predetermined number of bits, and said second PN code generating means includes means for generating said second PN code by repetition of data of a second predetermined number of bits different from said first predetermined number of bits.

4. A spread spectrum communication system in accordance with claim 2, wherein said first PN code generating means includes means for generating said first PN code by repetition of data of a predetermined number of bits with a first predetermined interval, and said second PN code generating means includes means for generating said second PN code by repetition of data of said predetermined number of bits with a second predetermined interval different from said first predetermined interval.

5. A spread spectrum communication system in accordance with claim 1, wherein said reproducing means includes multiplying means for multiplying said received spread spectrum signal by said second PN code.

6. A spread spectrum communication system in accordance with claim 1, further comprising disabling means for disabling said first PN code generating means when said on-off keying signal is in an off-state.

7. A spread spectrum communication system in accordance with claim 6, further comprising initializing means for initializing said first PN code generating means at a trailing edge of said on-state of said on-off keying signal.

8. A spread spectrum communication system in accordance with claim 6, further comprising disabling means for disabling said second PN code generating means when no spread spectrum signal is received by said receiving means.

9. A spread spectrum communication system in accordance with claim 8, further comprising initializing means for initializing said second PN code generating means when said receiving means becomes not to receive said spread spectrum signal.

10. A spread spectrum communication system in accordance with claim 1, wherein said spread spectrum modulating means includes modulating means for modulating said carrier signal by said on-off keying signal, and a multiplying means for multiplying an output of said modulating means by said first PN code.

11. A spread spectrum communication system in accordance with claim 1, wherein said spread spectrum demodulating means includes multiplying means for multiplying said spread spectrum signal as received by said second PN code.

12. A spread spectrum communication system in accordance with claim 1, wherein said spread spectrum modulating means includes an oscillator which is enabled or disabled by said on-off keying signal and has a variable capacitance element, a capacitance of said variable capacitance element being changed by said first PN code, resultingly said spread spectrum signal is generated.

13. A spread spectrum communication system in accordance with claim 1, wherein said reproducing means includes an oscillator, and by operating said oscillator in response to the presence of a spread spectrum signal received by said receiving means, whereby said carrier signal modulated by said on-off keying signal is generated.

14. A remote control system, comprising:
   a key;
   converting means for converting a key signal from said key into an on-off keying signal;
   first PN code generating means for generating a first PN code;
   spread spectrum modulating means, responsive to said on-off keying signal, for producing a spread spectrum signal in which a carrier signal is modulated by said on-off keying signal and said first PN code;
   means for transmitting said spread spectrum signal;
   receiving means for receiving said spread spectrum signal as transmitted from said transmitting means;
   reproducing means, based on said spread spectrum signal received by said receiving means, for reproducing a carrier signal demodulated by said spread spectrum modulating means, said reproducing means including second PN code generating means for generating a second PN code having a phase which is gradually changed with respect to a phase of said first PN code, and spread spectrum demodulating means for spread spectrum demodulating a received spread spectrum signal by said second PN code from said second PN code generating means; and
   means for detecting a reproduced carrier signal and for outputting said on-off keying signal.

15. A remote sensing system, comprising:
   a sensor for inputting an on-off keying signal;
   first PN code generating means for generating a first PN code;

spread spectrum modulating means, responsive to said on-off keying signal, for producing a spread spectrum signal in which a carrier signal is modulated by said on-off keying signal and said first PN code;

means for transmitting said spread spectrum signal;

receiving means for receiving said spread spectrum signal as transmitted from said transmitting means;

reproducing means, based on said spread spectrum signal received by said receiving means, for reproducing a carrier signal demodulated by said spread spectrum modulating means, said reproducing means including second PN code generating means for generating a second PN code having a phase which is gradually changed with respect to a phase of said first PN code, and spread spectrum demodulating means for spread spectrum demodulating a received spread spectrum signal by said second PN code from said second PN code generating means; and means for detecting a reproduced carrier signal and for outputting said on-off keying signal.

16. A spread spectrum communication system, comprising:

inputting means for inputting an on-off keying signal;

first PN code generating means for generating a first PN code;

spread spectrum modulating means, responsive to said on-off keying signal and said first PN code, for producing a spread spectrum signal in which a carrier signal is modulated by said on-off keying signal and said first PN code, said spread spectrum modulating means including an oscillator which is enabled or disabled by said on-off keying signal and has a variable capacitance element, and a change of the capacitance of said variable capacitance element being defined by said first PN code;

means for transmitting said spread spectrum signal;

receiving means for receiving said spread spectrum signal transmitted from said transmitting means;

reproducing means for reproducing, based on said spread spectrum signal received by said receiving means, said carrier signal having been modulated by said spread spectrum modulating means; and means for detecting a reproduced carrier signal and for outputting said on-off keying signal.

17. A spread spectrum communication system, comprising:

inputting means for inputting an on-off keying signal;

first PN code generating means for generating a first PN spread spectrum modulating means, responsive to said on-off keying signal and said first PN code, for producing a spread spectrum signal in which a carrier signal is modulated by said on-off keying signal and said first PN code;

means for transmitting said spread spectrum signal;

receiving means for receiving said spread spectrum signal transmitted from said transmitting means;

reproducing means for reproducing, based on said spread spectrum signal received by said receiving means, said carrier signal having been modulated by said spread spectrum modulating means, said reproducing means including an oscillator for generating said carrier signal, and said oscillator being operated in response to the presence of a spread spectrum signal received by said receiving means; and means for detecting a reproduced carrier signal and for outputting said on-off keying signal.

* * * * *